United States Patent
Uribe Plaza (10) Patent No.: US 12,330,383 B2
(45) Date of Patent: Jun. 17, 2025

(54) AUTOMATIC MACHINE FOR REPAIRING PLASTIC SHEETS

(71) Applicant: PLASTIC REPAIR SYSTEM 2011, S.L., Pamplona (ES)

(72) Inventor: Jose Ignacio Uribe Plaza, Alsasua (ES)

(73) Assignee: PLASTIC REPAIR SYSTEM 2011, S.L., Pamplona (ES)

( * ) Notice: Subject to any disclaimer, the term of this patent is extended or adjusted under 35 U.S.C. 154(b) by 88 days.

(21) Appl. No.: 18/261,791

(22) PCT Filed: Jan. 20, 2022

(86) PCT No.: PCT/ES2022/070027
§ 371 (c)(1),
(2) Date: Jul. 17, 2023

(87) PCT Pub. No.: WO2022/157409
PCT Pub. Date: Jul. 28, 2022

(65) Prior Publication Data
US 2024/0083124 A1    Mar. 14, 2024

(30) Foreign Application Priority Data
Jan. 21, 2021    (ES) ............................... ES202130035

(51) Int. Cl.
*B29C 73/04*    (2006.01)
*B29C 73/26*    (2006.01)
(Continued)

(52) U.S. Cl.
CPC .............. *B29C 73/04* (2013.01); *B29C 73/26* (2013.01); *B29C 73/34* (2013.01); *B29C 2073/264* (2013.01); *B29L 2007/002* (2013.01)

(58) Field of Classification Search
CPC ......... B29C 73/26; B29C 73/04; B29C 73/24; B29C 73/34; B29C 2073/264; B29L 2007/002
See application file for complete search history.

(56) References Cited

U.S. PATENT DOCUMENTS

2006/0157190 A1    7/2006    Alberto et al.

FOREIGN PATENT DOCUMENTS

| DE | 2801637 A1 | 7/1979 |
| ES | 2388410 A1 | 10/2012 |

(Continued)

OTHER PUBLICATIONS

International Search Report and Written Opinion for Corresponding International Application No. PCT/ES2022/070027 (10 Pages) with English Translation, dated (May 24, 2022).

*Primary Examiner* — Virak Nguon
(74) *Attorney, Agent, or Firm* — LUCAS & MERCANTI, LLP (57) ABSTRACT

An automatic machine for repairing plastic sheets having incorporated in a support structure (3): —a rotary head (4), with several work stations with cutting device (5) for cutting the edge of a sheet (2), donor pellet supply device (6, 7), welding device (8) for welding the donor pellet, and pressing device (9) for pressing the weld thus made; —an outer bench (10) for situating the sheet (2) to be repaired on same; —donor pellet fastening device (11); —sheet fastening device for holding the sheet (2); and —operation control device connected to a programmable logic controller.

20 Claims, 8 Drawing Sheets

(51) Int. Cl.
 *B29C 73/34* (2006.01)
 *B29L 7/00* (2006.01)

(56) References Cited

FOREIGN PATENT DOCUMENTS

| ES | 1158187 U | | 6/2016 |
|---|---|---|---|
| JP | 2004074690 A | * | 3/2004 |
| WO | 2017194796 A1 | | 11/2017 |

\* cited by examiner

AUTOMATIC MACHINE FOR REPAIRING PLASTIC SHEETS

CROSS-REFERENCE TO RELATED APPLICATIONS

This application is a 371 of PCT/ES2022/070027, filed Jan. 20, 2022, which claims the benefit of Spanish Patent Application No. P202130035, filed Jan. 21, 2021, each of which are incorporated herein by reference.

OBJECT OF THE INVENTION

As expressed in the title of the present specification, the invention relates to an automatic machine for repairing plastic sheets which provides the advantages and features described in detail below to the function for which it is intended.

More specifically, the object of the invention relates to an automatic machine for repairing plastic sheets, in particular cellular polypropylene sheets, of the type used, for example, as separating elements in the glass bottle industry to separate rows of bottles while they are being handled, transported, and stored, said machine being provided with cutting means for cutting a defective region on the border of the sheet, supply means for supplying a donor material pellet, welding means for welding said donor material pellet to the sheet, and pressing means for pressing the weld, further comprising sheet holding means for holding the sheet being worked on, holding means for holding the donor material pellet, and control means for the machine which allow each of said operations to be performed in rapid, automatic, and continuous cycles.

FIELD OF APPLICATION OF THE INVENTION

The field of application of the present invention is comprised in the sector of the industry dedicated to the manufacture of plastic sheets, and in the sector of the industry that uses plastic sheets in handling, transporting, and/or storing bottles or other products.

BACKGROUND OF THE INVENTION

The problem which the present invention intends to resolve is the enormous plastic sheet waste produced because said sheets present damages or defects, mainly in industries using cellular polypropylene sheets as separating elements for separating rows of bottles and of other types of containers.

The sheets are normally reused in more than one service. However, the sheets are typically disposed of because they present damages or defects rendering them useless for the task for which they are intended. The need for a machine that can repair plastic sheets so that they can be used again is considered. Furthermore, however, said repair must be performed at a low economic cost that does not represent a cost exceeding the cost that a completely new sheet may have.

The objective of the present invention is, therefore, to develop an automated machine to perform all the phases of the repair process described herein, preventing the enormous waste of deteriorated sheets and saving the cost of replacing them with new sheets.

In reference to the current state of the art, it should be mentioned that different methods for repairing sheets are known, although at least the applicant is unaware of the existence of any one having the same or similar technical and structural features as the machine herein claimed.

In said sense, it should be mentioned that the applicant is the proprietor of a number of documents, namely documents ES1158187U, ES2388410, and WO2017/194796, which describe a repaired plastic product and methods for repairing plastic products, respectively, but more particularly target solid polypropylene products and processes for repairing same, which do not serve or are not suitable for repairing the type of cellular polypropylene sheets described above, since they have very particular characteristics. In any case, they do not disclose a machine such as the one herein proposed either.

DISCLOSURE OF THE INVENTION

Based on the foregoing, and after a thorough study, the applicant has observed that due to the characteristics of the cellular polypropylene sheets used in the industry as separating elements for glass bottles and other types of containers, the repair thereof presents a series of difficulties that other types of sheets such as solid plastic sheets do not present. Namely, instead of being made of solid plastic, cellular polypropylene sheets have small pockets (or cells) of very little thickness. For example, sheets measuring 1200×1000×3.5 mm, with cell walls measuring barely 0.5 mm, and with the borders sealed to prevent water from entering and contaminating the containers during the container washing phases, can be found in the industry.

After analyzing a number of damaged sheets, the applicant has classified damages according to different patterns of common characteristics. The applicant has considered that the repair of sheets with a damaged or defective border can be approached based on these patterns of damages. Sheets with a damaged border represent about half of the analyzed sheets. As used herein, the term "border" is to be understood in a broad and non-limiting sense, referring to both the edge of the sheet (outer border) and a region contiguous to same (perimetral region). Repair in other regions is ruled out due to the host of actions that would have to be performed, with the subsequent increase in costs.

Once the reparable damages have been delimited to a specific region (border of the sheet), the applicant has analyzed how to perform the repairs. It is considered that for the repair, a portion of the sheet in which damage to the sheet can be located must be cut and replaced with a donor pellet (portion of undamaged material) like a graft, with a shape corresponding to the gap left in the sheet after cutting, welding said donor pellet to the sheet. There is defined an area in which the damages located therein will be repaired in one go. After several tests, the applicant has observed that areas demarcated by an outer segment coinciding with the edge of the sheet and an inner segment (where the cutting and welding are performed) with a curved contour are suitable. These features allow several advantages, as explained below.

The stresses exerted on one part of the graft are distributed in several directions of the sheet, such that the sheet does not become deformed in the welding region. A longitudinal weld, however, would cause the sheet to bend in the welding region.

In one and the same weld, the directions of the weld with respect to the pockets of the sheet are of various types, such as a weld longitudinally aligned with the pockets, an oblique weld, and/or a transverse weld. This implies the certainty of achieving a strong weld.

This allows the weld to be performed in a continuous and uniform manner. The path of the weld does not present any sudden changes in direction which could lead to an accumulation of welding material, as would occur, for example, with a path with right angles.

The applicant has observed that the most suitable areas are those the inner segment of which is circular, for example, with a radius of 150 mm.

It must be taken into account that the entire edge of the sheet is sealed, so the graft (donor pellet) must have part of the edge sealed, namely the part intended for being arranged at the edge of the sheet. This graft can be obtained, for example, by cutting it from the border of donor sheets. Multiple grafts can be obtained along the border of each donor sheet.

The applicant has performed repair tests using solid plastic sheet welding processes. As a result, it can be observed that these welding processes are not suitable for cellular materials. The walls forming the pockets of the sheet are so thin that by providing slight heat, the sheet deforms and melts.

In order for the weld to allow a suitable product to be obtained, the applicant sees the need for the filler material to penetrate the cellular cavities of the sheet, such that with just the heat provided by the welding material, penetrating the pockets, a large surface area is successfully adhered as a result of the filler material.

According to that set forth above, in order to obtain good-quality repairs with reduced costs, the applicant considers that it is not feasible to perform repairs manually, and that there is a need to automate the operations by means of a machine.

The automatic machine for repairing plastic sheets proposed by the invention represents an improved alternative to what is already known, with the characterizing details that make it possible and suitably distinguish it being described in the final claims attached to the present description.

As mentioned above, the invention proposes an automatic machine for repairing plastic sheets, particularly conceived for repairing cellular polypropylene sheets of the type used, for example, as separating elements in the glass bottle industry to separate rows of bottles, which machine is essentially distinguished by comprising, integrated therein, cutting means for cutting a defective region on the border of the sheet, supply means for supplying a donor material pellet (also referred to as donor pellet) to replace the cut portion, welding means for welding said donor material pellet, and pressing means for pressing the weld made, and also sheet holding means for holding the sheet being worked on, holding means for holding the donor material pellet, and control means for the machine which allow each of the mentioned operations to be performed in rapid, automatic, and continuous cycles.

More specifically, the machine of the invention comprises, incorporated in a support structure, the following elements:

A rotary head, or carousel-like rotary drum, in which several work stations with devices are integrated for performing different actions on the sheet to be repaired and which define the cutting means for cutting a defective region of the sheet, the supply means for supplying a donor material pellet to replace the cut portion, the welding means for welding said donor material pellet, and the pressing means for pressing the weld made. The devices are arranged on a rotary base plate and perform different operations, according to each case.

According to a preferred embodiment, the donor pellet supply means comprise specific supply means for supplying a straight segment donor pellet, to replace a cut portion of a straight segment of the border of the sheet; and specific supply means for supplying a corner donor pellet, to replace a cut portion of a corner of the sheet.

In the preferred embodiment, the head comprises five work stations, although it may optionally have another number of stations.

In the preferred embodiment, said five work stations of the head are those described below, arranged in the following order:

A station with a die-cutting device (or die-cutting station), which die cuts the defective region of the sheet. It works under the action of a pneumatic or hydraulic cylinder, preferably a pneumatic cylinder. The die-cutting device die cuts the defective region of the sheet in an essentially perpendicular manner, such that the die cut contours are essentially perpendicular to the upper and lower surfaces of the sheet.

A station with a donor pellet store/dispenser for storing/dispensing donor pellets in the form of a straight segment piece (or a straight segment pellet storage/dispensing station). Preferably, this station comprises a vertical housing or store with a pneumatic cylinder at the base. The pneumatic cylinder comprises a locating member (or finger) that pushes one of the pellets from said store to the welding region.

A positioner, namely, a plate having the thickness of a donor pellet which pushes the donor pellet to the welding position when actuated by a cylinder, is referred to as a "locating member".

The dispensing of the pellets on the base plate occurs due to gravity. When the donor pellet is pushed and the locating member is subsequently retracted, the next pellet falls due to gravity, thus being prepared to be pushed in the next dispensing operation.

The curved edge of the donor pellets preferably has a radius 5.5-6.5 mm smaller than the radius of the region of the sheet to be repaired.

The curved edge of the donor pellet is essentially perpendicular to the upper and lower surfaces of the donor pellet so that it can be suitably welded to the edge of the sheet left after perpendicularly die-cutting the defective part. The two welding surfaces (curved edge of the donor pellet and curved edge of the sheet) are therefore essentially parallel to one another.

A station with a donor pellet store/dispenser for storing/dispensing donor pellets in the form of a corner (or a corner pellet storage/dispensing station). Like in the preceding case, it comprises a vertical store with a pneumatic cylinder at the base. The pneumatic cylinder comprises a locating member (or finger) which pushes one of the pellets to the welding region.

According to an alternative, this station with a corner donor pellet store/dispenser can be located before the aforesaid station with a straight segment donor pellet store/dispenser.

According to an alternative, the machine may comprise a single pellet storage/dispensing station, in turn comprising a vertical housing with a pneumatic cylinder at the base and a locating member for pushing the pellets to the welding region. This station can be of one of the types mentioned above, i.e., a station with a straight segment donor pellet store/dispenser or a station with a corner donor pellet store/dispenser.

A station with a welding device (or welding station) which welds the donor pellet to the sheet. Preferably, the welding device is a standard manual extruder gun, fitted to the machine for the automated operation thereof. Preferably, this extruder provides to the assembly through a nozzle (preferably a Teflon nozzle) a uniform amount of plastic material, preferably polypropylene for the specific case of repairing cellular polypropylene sheets, at 235° C. in plastic state, with a flow rate of 2 Kg/h of material and an application rate of 0.60 m/min.

According to a preferred embodiment, the station with a welding device comprises a scraper configured for removing, before starting a new weld, cold welding material residues which may be left in the nozzle of the device after a weld of the previous cycle. Said scraper is arranged flush with the nozzle, preferably at the base plate of the head. Therefore, during the movement of the welding device towards the start of the weld, the scraper cuts like a knife the welding material residues left in the nozzle after the previous cycle. Once they are cut, the material residues can be discharged into a collection receptacle. The discharge of the material residues can be performed due to gravity through a spillway formed, for example, by a discharge hole. Should it be required, the discharge hole goes through one or more parts of the machine so that the material residues can freely fall into the collection receptacle.

According to another preferred embodiment, the welding device comprises a resistor (or equivalent heating means) in the nozzle, preferably around said nozzle. This resistor is intended for keeping the nozzle hot and, accordingly, for preventing the welding material that is in the nozzle from cooling down. As a result of the operation of the resistor, it is not necessary to remove welding material before starting a new weld and, therefore, the aforementioned scraper is not necessary. This, for example, allows preventing jams in spillway due to the accumulation of material residues. The resistor can be an alternative solution with respect to the aforementioned scraper, or it can be complementary to said scraper.

A station with a pressing device (or pressing station) that presses the weld bead. The "pressing" of the weld is performed for the weld to penetrate the pockets of the cellular sheet, and for the weld to be flush with the surface thereof, thereby avoiding having to perform a later process to remove the welding surplus that comes out.

The pressing device preferably comprises a pneumatic cylinder which acts on a part, which is preferably metallic, moving it up or down to exert pressure on the weld bead of the sheet.

The welding device and the pressing device can optionally be integrated in one and the same work station. In this case, the pressing device preferably comprises a roller travelling over the weld bead, applying pressure so as to press it.

An outer bench. Likewise, the machine comprises an outer work bench, which is configured for situating the sheet on same and is coupled to the support structure of the machine. The outer bench has a notch in the region thereof closest to the head (on the side of the outer bench whereby it is coupled to the support structure of the machine). The notch is preferably centered with respect to the center of the bench. The notch is configured for the operator to situate the region of the sheet to be repaired (defective region) on same and for different means of the machine to be able to travel over and act on the sheet without colliding with the outer bench. Furthermore, the outer bench preferably comprises a sheet holding region (for holding the part of the sheet that is not damaged). The holding is preferably performed by vacuum, through suction openings of the outer bench. The upper surface of the outer bench is preferably located at the same height as the upper surface of the base plate of the head.

Donor pellet holding means intended for holding the donor pellet that is welded in the gap left in the sheet after die-cutting. Preferably, the donor pellet holding means for holding the donor pellet to be welded is an inner bench. The inner holding bench moves up or down depending on the operation to be performed, as a result of the action of the rod of a cylinder, preferably a pneumatic cylinder, on which the bench is incorporated. The inner bench is attached to a support inserted in vertical guides, such that the inner bench can travel in a guided manner between a lower position and a higher position with respect to the height of the outer bench, and vice versa. The inner bench is always in a higher position except for when the die-cutting device is positioned in the working region, i.e., in the region where the sheet is arranged in order to be repaired. When the die-cutting device is positioned in the working region, the inner holding bench is in the lower position so as not to collide with the die-cutting device. The holding is preferably performed by vacuum through suction openings of the inner bench.

The donor pellet holding means can optionally be of another kind. For example, the donor pellet holding means can be a mobile holding plate pivoting about the shaft of the rotary head so as to be positioned in the corresponding donor pellet store/dispenser, as needed, and in the working region. The mobile holding plate is configured for being able to travel in a manner contiguous to the outer region of the head and concentric thereto, optionally at the same height as the base plate and the outer bench.

The mobile holding plate (with suction openings) holds the donor pellet that it going to be welded to the sheet. The mobile holding plate can rotate independently of the actual rotation of the head. In other words, the working devices (installed on the base plate) rotate with the rotation of the head so as to enable being situated in the working region. In turn, the mobile holding plate is a rotation mechanism that is independent of the rotation mechanism of the head, which allows the relative (rotational) movement of the mobile holding plate with respect to the base plate. The base plate has a recessed region having a smaller radius which allows the relative (rotational) movement between the mobile holding plate and the base plate.

The mobile holding plate is situated below the corresponding donor pellet store/dispenser, receives the donor pellet, holds it by vacuum (preferably with suction openings), such that it is kept in the working region (position of "donating" to the base sheet) until the head rotates and situates the welding station in the working region, which welds the donor pellet to the sheet.

As an alternative or in addition to the holding performed by the inner bench or, where appropriate, the mobile holding plate, according to a preferred embodiment, the donor pellet holding means comprise one or more mechanical anchorings in one or more work stations; preferably one mechanical anchoring in the welding station and another mechanical anchoring in the pressing station. The mechanical anchoring in the welding station is preferably actuated by one or more preferably pneumatic cylinders. The mechanical anchoring in the welding station preferably comprises a platform which is movable under the action of the cylinder or cylinders until contacting the donor pellet, in order to hold said pellet against the inner holding bench or, where appropriate, against the mobile holding plate during welding. The mechanical anchoring in the pressing station preferably comprises one or more hold-down plates actuated by respective pressure springs arranged, for example, in the corresponding hold-down plate. The hold-down plate or plates contact the donor pellet so as to hold said pellet against the inner bench or, where appropriate, against the mobile holding plate during pressing.

The machine also comprises sheet holding means for holding the sheet, preferably located in the outer bench (holding region of the outer bench). The sheet holding means for holding the sheet are intended for holding the part of the sheet that is not damaged.

According to a preferred embodiment, the machine comprises a pneumatic vacuum system configured for acting on the donor pellet holding means and the sheet holding means. The pneumatic vacuum system preferably comprises a motor and a suction pump, as well as suction openings made in the outer bench and in the donor pellet holding means. The motor and the suction pump are preferably located in the lower part of the structure of the machine, for example, behind a scrap bin provided in the lower part thereof, as explained below. They can optionally be located inside a cupboard.

As an alternative or in addition to the vacuum holding performed by the outer bench, according to a preferred embodiment, the sheet holding means for holding the sheet comprise a mechanical anchoring. The mechanical anchoring is preferably actuated by one or more preferably pneumatic cylinders. According to a more preferred embodiment, the mechanical anchoring of the sheet comprises a bar that is movable under the action of the cylinder or cylinders until contacting the sheet, holding same against the outer bench.

Operation control means for the machine connected to a programmable automaton. The operation control means for the machine comprise a control panel with several controls, preferably one of the following: machine startup, straight segment repair process (straight segment mode), corner repair process (corner mode). The control panel is preferably a touch control panel. Said control panel may optionally be a keypad.

The control means also comprise a cycle start control. Preferably, the cycle start control is a pedal. The pedal is configured for the machine to start the automatic cycle, including the holding of the sheet, when said pedal is held down. Said pedal is preferably situated in the working region, under the outer bench. The pedal is preferably an electric pedal and sends the order to a programmable automaton (PLC) to start the cycle. The cycle start control can optionally be a control located in the control panel itself. According to an alternative, there is one control for actuating the sheet holding means for holding the sheet and another control (for example, the pedal) for starting the cycle. The control means may also comprise an emergency stop button, which can be located in the control panel itself or somewhere else in the machine that is easy for the operator to access.

The structure of the machine preferably comprises a fairing to protect the different parts of the machine. There is provided in the fairing the existence of doors, allowing the operator to access the inside of the machine, for loading the pellet stores, supplying the machine with a roll of plastic (roll of welding wire that feeds the extruder and exits at a given temperature and in a plastic state after being heated in the extruder screw), etc.

Preferably, these doors have safety switches for the machine to be stopped automatically if the doors are open. Furthermore, in the preferred embodiment, in the front part of the machine, between the fairing and the outer bench, there is a gap, preferably measuring 10 mm, so that the sheet to be repaired can pass through same, but the hands or other parts of the operator's body do not fit in said gap.

Likewise, optionally, the machine further comprises a front protective shield. It is preferably a transparent shield located in the front as a protection, so that the operator cannot insert his or her hands or other body parts into dangerous regions of the machine. In the front part of the machine, between the front protective shield and the outer bench, there is a gap, preferably measuring 10 mm, through which the sheet to be repaired can pass, but through which, as a safety measure, the hands or other parts of the operator's body do not fit.

Moreover, the machine also preferably comprises positioning stops, which are configured for positioning the sheet against same such that the defective part of the sheet is located on the notch of the outer bench and facing the head. The stops are preferably arranged on the outer bench.

In the preferred embodiment, the machine comprises stops of two types for positioning the sheets to be repaired in one way or another, depending on where the defective region of the sheet is located (in a corner or in the straight segment). Therefore, on one hand, it comprises straight segment stops, which are preferably fixed, although they can also be movable (retractable), and corner stops, which are preferably movable (retractable). Depending on the mode selected for the operation of the machine, the movable corner stops move up or down, preferably due to pneumatic actuation. In the case of the machine operating in corner mode, the corner stops move up so as to be able to position the corner of the sheet on the notch. In the case of the machine operating in straight segment mode, the corner stops move down and allow the sheet to be positioned against the straight segment stops with the defective region on the notch.

The machine preferably comprises a presence sensor. The outer bench comprises an opening with a presence sensor, preferably in the central region of the bench, detecting the presence of a sheet to be repaired. The presence sensor is a safety element which allows the repair cycle not to be started if the operator started the cycle without placing the sheet to be repaired.

The structure of the machine preferably comprises an upper plate and a lower plate in which the upper end and the lower end of the rotating shaft of the head (and the corresponding bearings) are installed, respectively.

The machine preferably comprises a scrap bin formed by a receptacle located in the lower region of the machine, under the lower plate. Once the defective part of the sheet has been cut by means of the die-cutting device, the trimming (scrap) falls into said scrap bin.

Optionally, the machine likewise comprises a scrap receiving ramp, consisting of an inclined plate or a collapsible ramp located under the outer bench for receiving the defective pieces (scraps) of the sheet after die-cutting and directing them to the scrap bin. In the event that the donor pellet holding means are the inner bench, when it moves up, the inner bench itself closes the collapsible receiving ramp, by contact. When the inner bench moves down, the collapsible receiving ramp drops down due to its own weight and opens such that it is arranged for receiving and directing the scraps to the scrap bin.

The rotary head preferably comprises an upper platform which divides said head into two heights. Above the upper platform (upper height), there are some components of the machine, for example, the roll of welding wire, which feeds the welding device; and the reduction gear for the rotation of the welding device in the surrounding area of the station thereof.

As a head rotation system, the machine preferably comprises an autonomous system independent of the rotation of the welding device in the surrounding area of the station thereof. The head rotation system is preferably located in the lower region of the machine and comprises a servomotor and a gear ring.

Therefore, as a result of the machine and the interaction of the operator with said machine, a repair process for repairing defective plastic sheets can be performed, wherein each repair cycle generally comprises the following automatic actions: die-cutting the defective part of the sheet, dispensing a donor pellet in the gap of the sheet that is left after die-cutting, welding the donor pellet to the sheet, pressing the weld bead. The machine rotates the rotary head to position the corresponding work station in the working region, as needed at all times in the cycle. Each work station is dedicated to performing one or more of the mentioned automatic actions. Additionally, in each cycle, the operator can perform actions such as positioning the defective sheet in the machine, starting the cycle, and removing the repaired sheet.

More particularly, the repair process and operation of the machine comprises the following:

In the initial position, the die-cutting station is located in the working region, and the donor pellet holding means are separated from the working region. In the event that the donor pellet holding means are the inner bench, said inner bench is located in its lower position, and the scrap receiving ramp is open (deployed).

a) The operator places the damaged sheet in the outer bench, with the defective region on the notch of the outer bench.

The operator preferably places the sheet against positioning stops.

In the event that the machine can operate according to different modes, before the operator places the sheet, the operator selects the operating mode, preferably selecting from a corner repair mode and a straight segment repair mode. If the corner repair mode is selected, the machine preferably raises the corner stops, protruding from the bench. If the straight segment repair mode is selected, the machine preferably arranges the corner stops in a lowered position so that the operator can position the sheet against the straight segment stops.

b) The operator actuates the cycle start control, preferably a pedal.

c) The machine performs a cycle automatically according to the following actions:

The sheet holding means hold the sheet against the outer bench, preferably by vacuum (by means of the suction openings of the outer bench) and/or by mechanical anchoring. Optionally, instead of the outer bench and/or the mechanical anchoring, the operator can hold the sheet manually.

The die-cutting station cuts the defective part. Die-cutting is performed in a manner essentially perpendicular to the sheet, since, according to the method for welding sheets of this type, the two edges to be welded (of the donor pellet and the sheet) need to be essentially parallel and at 90° with respect to the upper and lower surfaces of the sheet. The die cutting speed is slow and progressive so as to not hit the sheet and damage the inner cells thereof; the die-cutting time is preferably about seconds. Die-cutting is preferably performed at room temperature. The cut is made such that the region marked in the sheet is confined to the defective part. Because of its shape and nature, the die-cutting device does not leave marks on the surface of the plate.

In the preferred case where the machine can operate according to different modes (for example, corner repair mode and straight segment repair mode), the die-cutting device preferably performs at all times the same type of die-cutting, regardless of the operating mode of the machine, with just the positioning of the sheet being what will determine whether the die cut is made in one region of the sheet or the other (for example, in a corner or in a straight segment).

The defective part (scrap) detaches from the rest of the sheet, preferably falling into the receiving ramp receiving and directing scrap to the scrap bin. When the scrap bin is filled or at any other time of interest, the scrap bin is emptied, either automatically or else by means of the operator.

The machine rotates the head for situating the donor pellet storage/dispensing station in the working region.

In the preferred case where, for the machine to be able to operate according to different modes (for example, corner repair mode and straight segment repair mode) and to comprise more than one donor pellet store/dispenser (for example, a straight segment pellet store/dispenser and a corner pellet store/dispenser), the machine rotates the head for situating the store/dispenser specific in the working region.

The donor pellet holding means are situated in the working region.

In the preferred case where the donor pellet holding means are the aforementioned inner bench, said inner bench is situated (preferably operated by a pneumatic cylinder) in its highest position, with respect to the height of the outer bench. The collapsible scrap receiving ramp closes upon contact with the inner bench.

In the alternative case where the donor pellet holding means are the aforementioned mobile holding plate, this mobile holding plate pivots about the shaft of the rotary head so as to be positioned in the working region.

Once the storage/dispensing station (the corresponding store/dispenser, in the event that there is more than one) and the donor pellet holding means are in the working region, the storage/dispensing station dispenses a donor pellet and situates same on the donor pellet holding means.

The pellet is preferably arranged in the gap of the die cut with a separation with respect to the sheet of between 5.5 and 6.5 mm, in order to subsequently form the weld. The optimal separation is 6 mm. After several tests, this is the separation (6 mm) which, with less filler material, allows the entire cavity to be filled, reaching the lower part of said cavity without cooling down and completely filling the gap and pockets.

Dispensing is preferably performed as follows: the rod of a dispenser cylinder is extended, thus pushing a donor pellet (the rod preferably acts by means of a locating member) until situating it on the donor pellet holding means. The rod of the dispenser cylinder is retracted, and a new pellet falls onto the base plate due to gravity, being prepared to be dispensed in another cycle.

The donor pellet holding means hold the pellet, preferably by suction (by means of suction openings).

The machine rotates the head until situating the welding device in the working region (preferably an extruder gun), and the welding device welds the donor pellet to the sheet. In the event that the welding station includes a mechanical anchoring for the donor pellet, while welding, the donor pellet can be secured by said mechanical anchoring exclusively or in addition to the holding performed by the inner bench (or, where appropriate, to the holding performed by the mobile holding plate).

The weld is preferably developed by adding filler material between the sheet and the graft (donor pellet), preferably at a temperature comprised between 220° C. and 250° C., more preferably at 235° C.

The welding process may optionally comprise a step of preheating the sheet and the graft (donor pellet). Therefore, in the particular case of including preheating, the welding process comprises the following steps:

preheating the sheet and the graft (donor pellet) by means of air at a temperature comprised between 100° C. and 130° C., preferably at 115° C.;

adding the filler material between the sheet and the graft (donor pellet) at a temperature comprised between 220° C. and 250° C., preferably at 235° C.

Welding is preferably performed by shifting the welding device above the weld and along same. In the event that the welding device does not include a resistor in the nozzle or equivalent means keeping said nozzle hot, preferably, before welding starts, the cold welding residue (cold plastic) that may be left at the tip of the nozzle of the welding device after the previous cycle is removed. Explained in further detail, after welding ends, the nozzle of the welding device stops heating up and remains stopped while waiting for a new cycle, so the plastic material (filler material) left in the nozzle cools down. In order to start a new weld with filler material at the appropriate temperature, the cold welding residue from the previous cycle is first removed (purging process). The removal of the cold residue can be done as follows: before welding, the welding device expels the cold residue through the nozzle and moves towards the weld start position, passing above a scraper, removing the cold plastic residue from the tip of the nozzle by cutting it by way of a blade; the cold plastic residue can be discharged into a collection receptacle, for example, the scrap bin. The cold plastic residue can be discharged due to gravity through a spillway formed, for example, by a discharge hole which goes through the lower plate of the structure. In the preferred case where the nozzle has a resistor keeping it hot, the operation of said resistor prevents the welding material located in the nozzle from cooling down, whereby preventing the need to perform the aforementioned purging process.

In the preferred case where, for the machine to be able to operate according to different modes (for example, corner repair mode and straight segment repair mode), the welding device can apply the filler material in a longer or shorter run, depending on the operating mode.

The pressing device is shifted to the working region, and the weld bead is pressed.

Pressing is preferably performed by means of a part which moves down against the sheet to be repaired and acts on the entire surface of the weld at once.

Alternatively, pressing can be performed by means of a roller travelling over the weld bead, applying pressure on same during the travel thereof.

In the preferred case where the welding device and the pressing device are arranged in independent stations: once the welding device forms the weld, the machine rotates the head until situating the pressing station in the working region, and the pressing device presses the weld bead. In the event that the pressing station includes the mechanical anchoring for the donor pellet, during pressing, the donor pellet can be secured by said mechanical anchoring exclusively or in addition to the holding performed by the inner bench (or, where appropriate, to the holding performed by the mobile holding plate).

The machine is situated in the start position. Namely, the machine shifts the donor pellet holding means, separating same from the working region, and rotates the head to the start position (die-cutting station in the working region); the sheet holding means for holding the sheet and the donor pellet holding means no longer hold the sheet and the donor pellet, respectively, such that the repaired sheet is released so that it can be removed by the operator.

In the preferred case where the donor pellet holding means are the aforementioned inner bench, said inner bench is situated in the lower position thereof, and the scrap receiving ramp is open (deployed).

In the alternative case where the donor pellet holding means are the aforementioned mobile holding plate, this mobile holding plate pivots about the shaft of the rotary head so as to be separated from the working region.

d) The operator removes the repaired sheet. The machine is thereby prepared for a new cycle.

The approximate time of the cycle is 80 seconds.

The manual operations performed by the operator are preferably:

Feeding the sheets to be repaired in the machine, placing them in their correct position. In the event that the machine has different operating modes, selecting the operating mode. Starting the cycle.

During the repair cycle, checking the next sheet to be repaired. When the roll of welding wire which feeds the welding device runs out, placing another roll.

Emptying the scrap bin when it is full or when appropriate.

The sheet can optionally be held manually by the operator.

Through the description and claims, the word "comprises" and variants thereof do not intend to exclude other technical features, additives, components, or steps. Furthermore, the word "comprises" includes the case of "consists of". For those skilled in the art, other objects, advantages, and features of the invention will be inferred in part from the description and in part from the practice of the invention. The following examples are provided by way of illustration and do not intend to limit the present invention. Furthermore, the present invention covers all the possible combinations of particular embodiments herein indicated.

DESCRIPTION OF THE DRAWINGS

To complement the description being made and for the purpose of helping to better understand the features of the invention, a set of figures is attached to the present specification as an integral part thereof, in which the following is depicted in an illustrative and non-limiting manner.

PREFERRED EMBODIMENT OF THE INVENTION

In view of the mentioned figures and according to the numbering used, there can be observed in said figures a non-limiting embodiment of the automatic machine for repairing plastic sheets of the invention, which comprises that indicated and described in detail below.

Therefore, as can be seen in said figures, the machine (1) of the invention applicable for repairing a sheet (2), preferably cellular polypropylene sheets, comprises, incorporated in a support structure (3), at least:

- a rotary head (4), with several work stations with devices comprising at least:
  - cutting means (5) for cutting a defective region of the border of the sheet (2),
  - donor pellet supply means (6, 7) to replace the cut portion of the sheet,
  - welding means (8) for welding the donor pellet to the sheet, and
  - pressing means (9) for pressing the weld;
- an outer bench (10) defining the working region for situating the sheet (2) to be repaired on same; the outer bench (10) preferably comprises a notch in the region thereof closest to the head (4), which is configured for situating the defective region of the sheet (2) on same and for different means of the machine to be able to travel over and act on the sheet (2) without colliding with the outer bench (10)
- donor pellet holding means (11) for holding the donor pellet supplied by the corresponding means of the head (4);
- sheet holding means for holding the sheet (2); and
- operation control means for the machine which preferably comprise, in turn, a control panel (13) in the form of a touch screen or a keypad, and a cycle start control, connected to a programmable automaton. The cycle start control preferably consists of a pedal (not depicted) located under the outer bench (10). The programmable automaton is preferably located in the control panel (13) itself and controls the rotation of the head (4) to successively position the different work stations in the working region and actuate the devices of said stations.

According to a preferred embodiment, the donor pellet supply means comprise specific supply means for supplying a straight segment donor pellet (6) to replace a cut portion of a straight segment of the border of the sheet (2); and specific supply means for supplying a corner donor pellet (7) to replace a cut portion of a corner of the sheet (2)

In a preferred embodiment, such as the one shown in FIGS. 1 to 8, the head (4) comprises:

- as cutting means for cutting a defective region of the border of the sheet (2), a station with a die-cutting device (5), operating under the action of a preferably pneumatic cylinder;
- as supply means for supplying a straight segment donor pellet, a station with a straight segment pellet store/dispenser (6), preferably comprising a vertical housing with a pneumatic cylinder at the base and a locating member for pushing the pellets to the welding region;
- as supply means for supplying a corner donor pellet, a station with a corner donor pellet store/dispenser (7), preferably comprising a vertical housing with a pneumatic cylinder at the base and a locating member pushing the pellets to the welding region;
- as welding means, a station with a welding device (8), preferably comprising an extruder gun which supplies, through a nozzle, a bead of hot material in plastic state, from a roll of wire (26) provided for that purpose; and
- as pressing means for pressing the weld, a station with a pressing device (9), preferably comprising a pneumatic cylinder configured for acting on a part, moving it up or down to exert pressure on the weld of the sheet (2).

In an alternative embodiment, the machine may comprise a single pellet storage/dispensing station, in turn comprising a vertical housing with a pneumatic cylinder at the base and a locating member for pushing the pellets to the welding region. This station can be of one of the types mentioned above, i.e., a station with a straight segment donor pellet store/dispenser (6) or a station with a corner donor pellet store/dispenser (7).

According to another alternative embodiment, the machine may comprise several donor pellet storage/dispensing stations of one and the same type, for the purpose of increasing the storage/dispensing capacity, and therefore increasing the time during which the machine can operate without having to detain it for restocking donor pellets.

According to a preferred embodiment, the station with a welding device (8) comprises a scraper configured for cutting, before starting a new weld, welding material residues from a previous cycle that may be left in the nozzle of the welding device. The machine (1) may optionally comprise a spillway intended for discharging the welding material residues from the previous cycle left in the nozzle. The spillway can be formed by a discharge hole which, if needed, goes through one or more parts of the machine, so that the welding material residues can freely fall into a collection receptacle.

According to another preferred embodiment, the welding device (8) comprises a resistor in the nozzle, preferably around the nozzle. This resistor allows keeping the nozzle hot and, accordingly, prevents the welding material located in the nozzle from cooling down. As a result of the operation of the resistor, it is not necessary to remove the welding material before starting a new weld and, therefore, the scraper is not necessary. This, for example, allows preventing jams in the spillway due to the accumulation of material residues. The resistor can be an alternative solution with respect to the aforementioned scraper, or it can be complementary to said scraper.

In an alternative embodiment, the welding device (8) and the pressing device (9) are integrated in one and the same work station.

Figure 1:
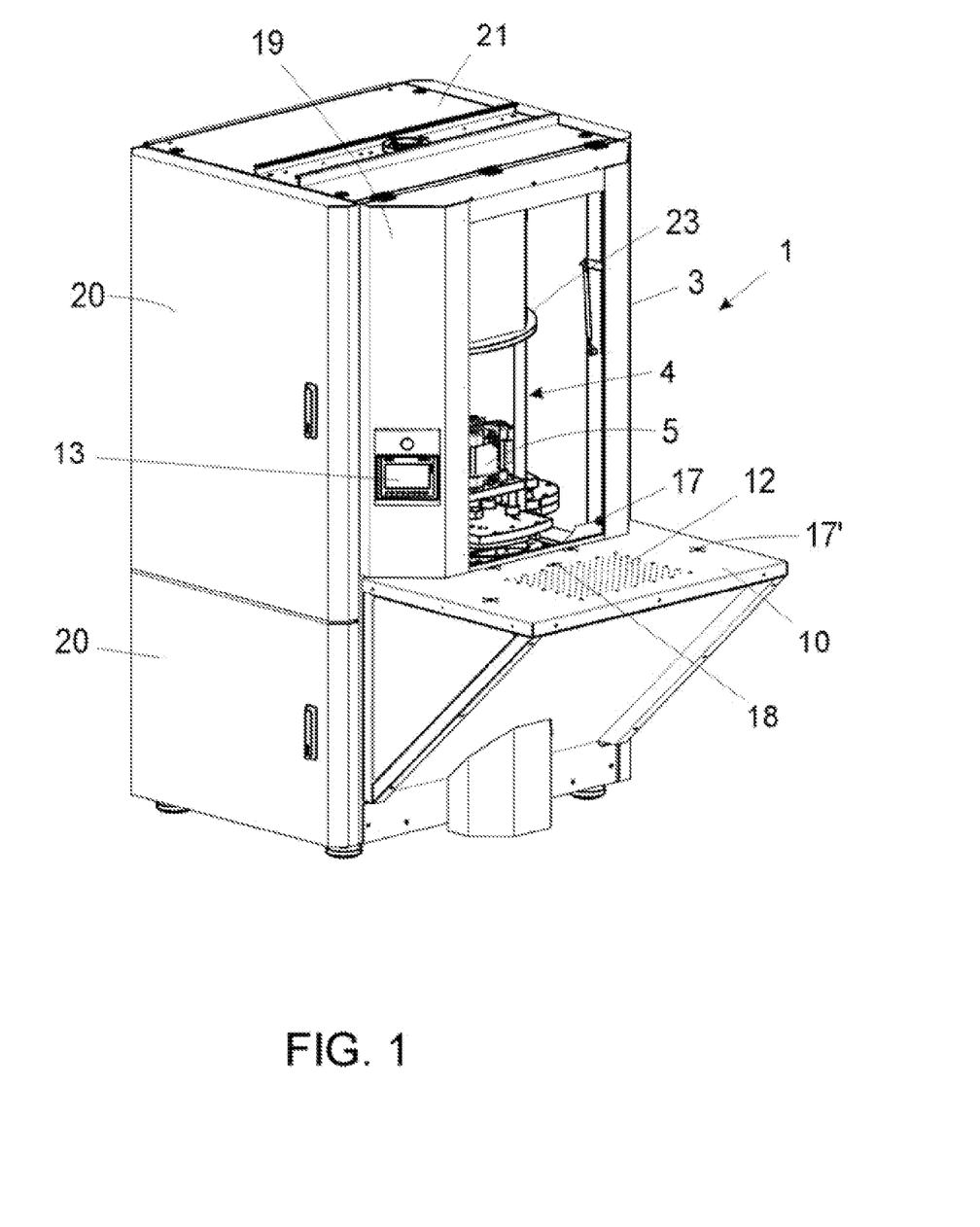
FIG. 1 shows a schematic perspective view of an embodiment of the automatic machine for repairing plastic sheets object of the invention, showing the external general configuration thereof.
Figure 2:
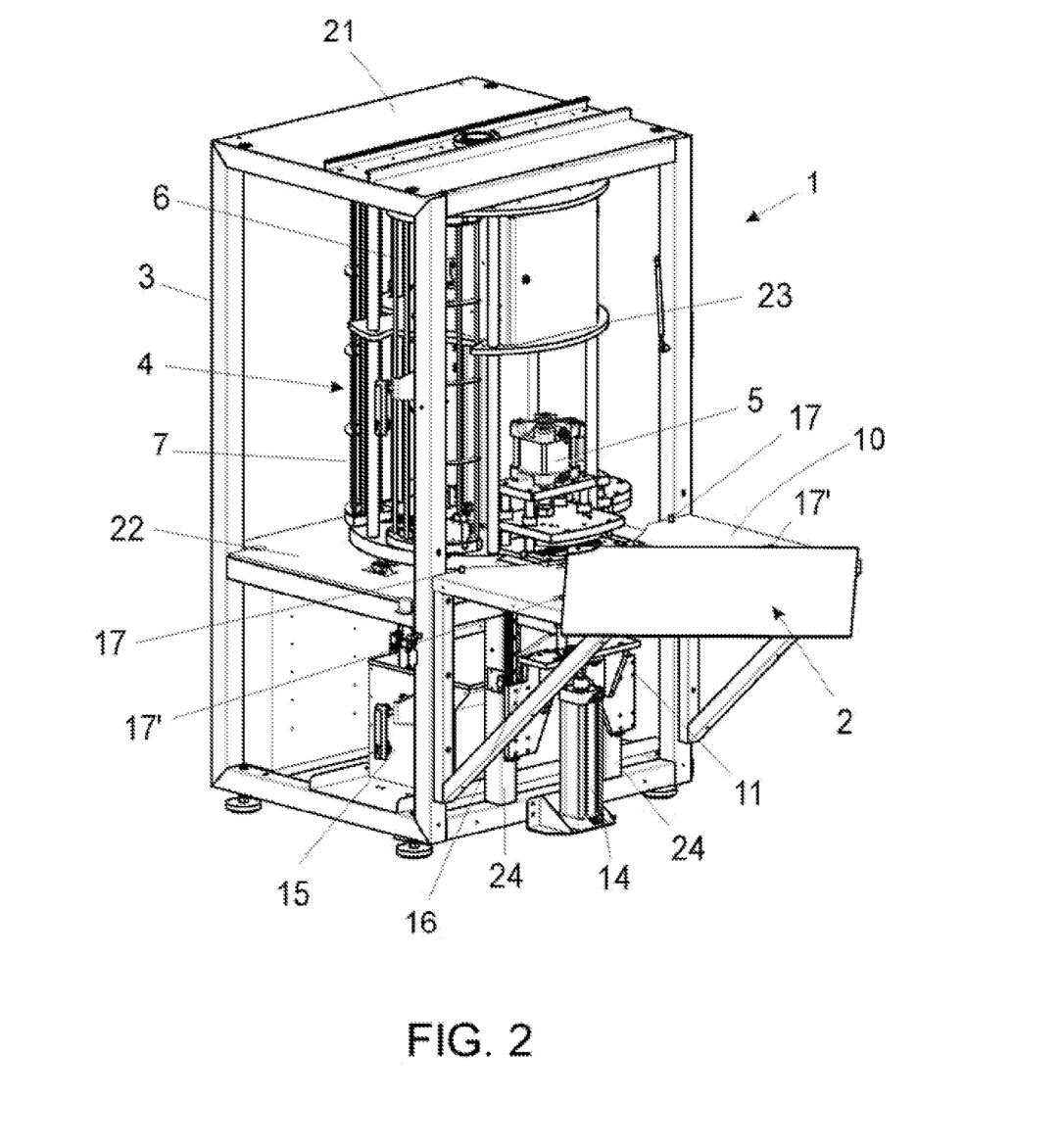
FIG. 2 shows a schematic perspective view of the example of the machine of the invention shown in FIG. 1, in this case depicted without a fairing, to enable better observing the internal components thereof, and including a sheet on the outer bench prepared for the repair of one of its corners, being depicted with the head in the start position, with the die-cutting station positioned in the working region.
Figure 3:
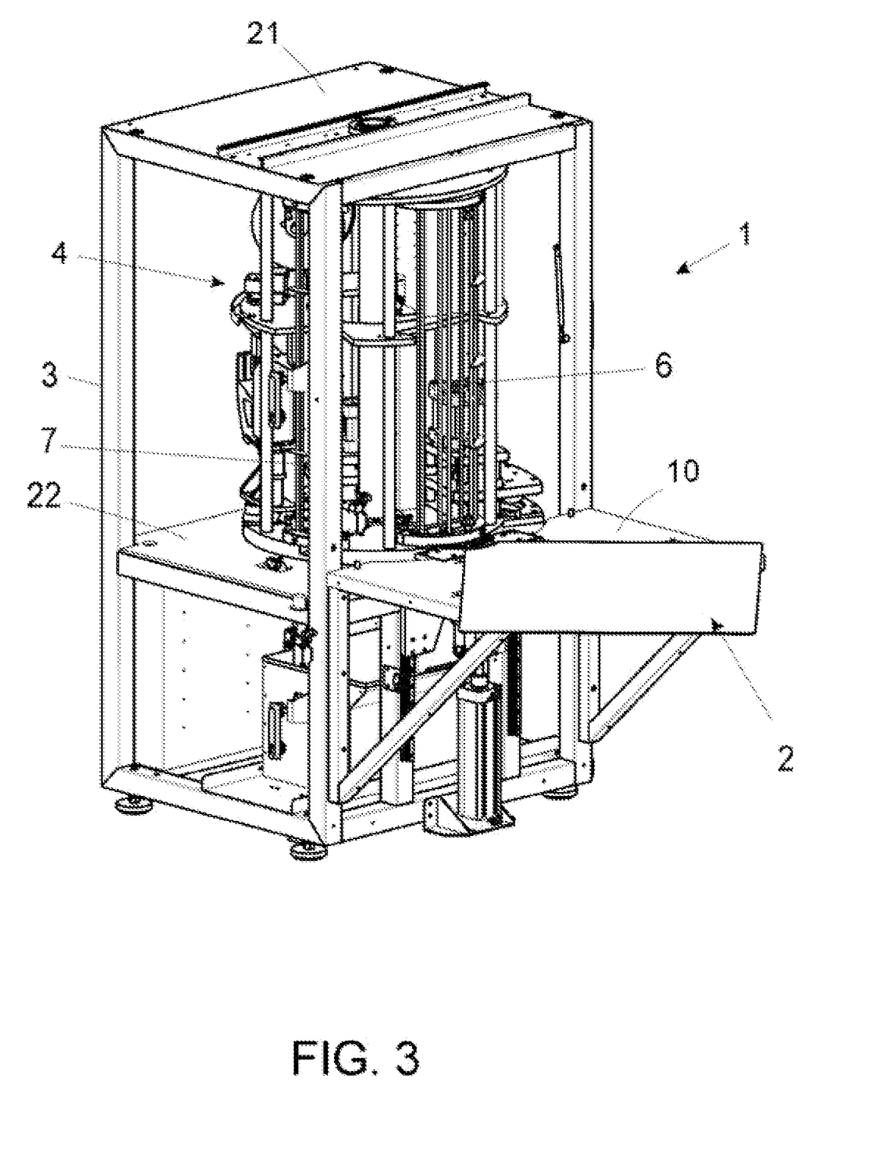
FIG. 3 shows a schematic perspective view of the example of the machine of the invention shown in FIG. 2, also without a fairing, in this case depicted with the straight segment donor pellet store passing through the working region.
Figure 4:
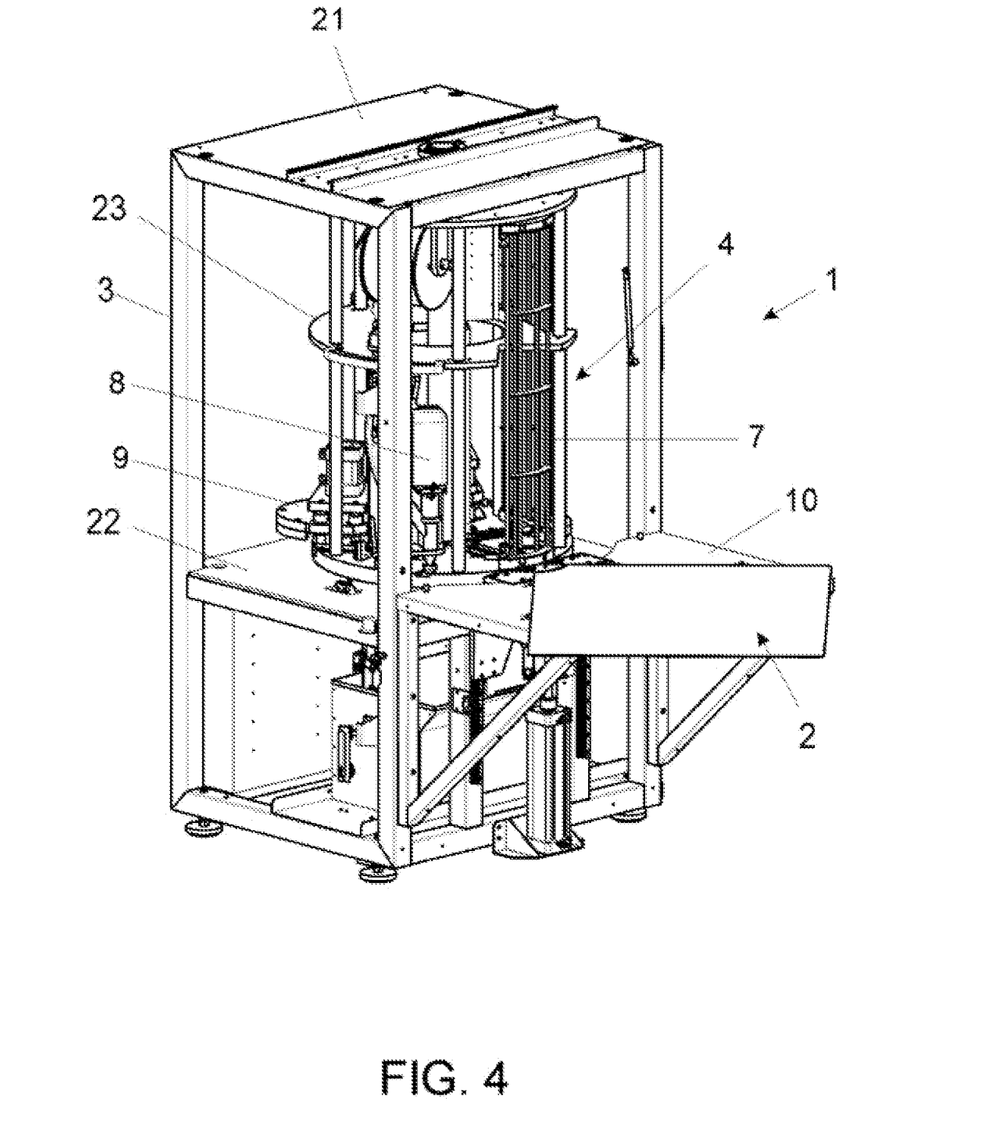
FIG. 4 shows a schematic perspective view of the machine of the invention shown in the preceding figures, in this case depicted with the corner donor pellet store in the working region.
Figure 5:
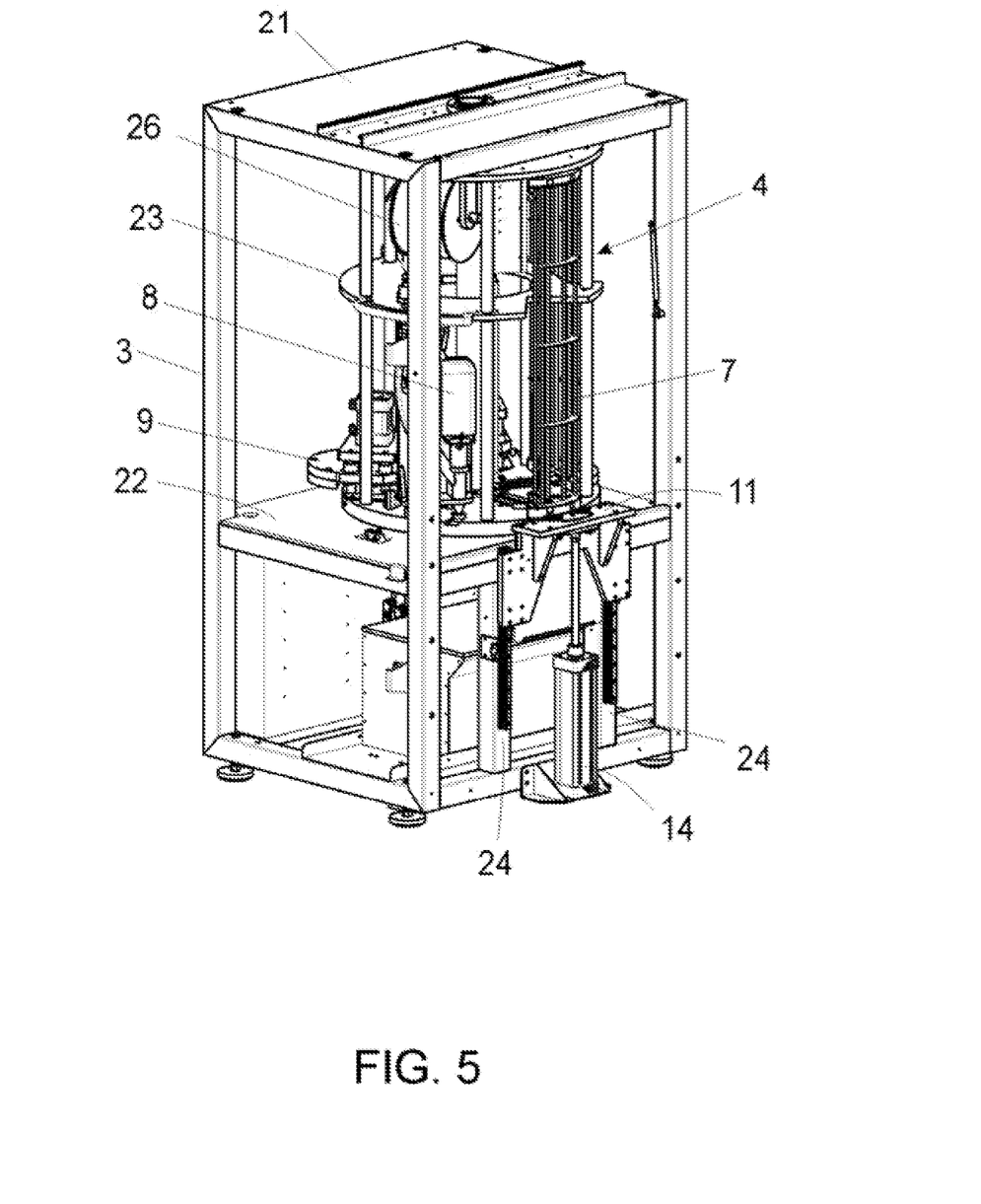
FIG. 5 shows a schematic perspective view of the machine of the invention shown in the preceding figures, depicted, like in the preceding case, with the corner donor pellet store in the working region, but without the outer bench, to enable seeing the inner bench in its highest position and the receiving ramp closed.
Figure 6:
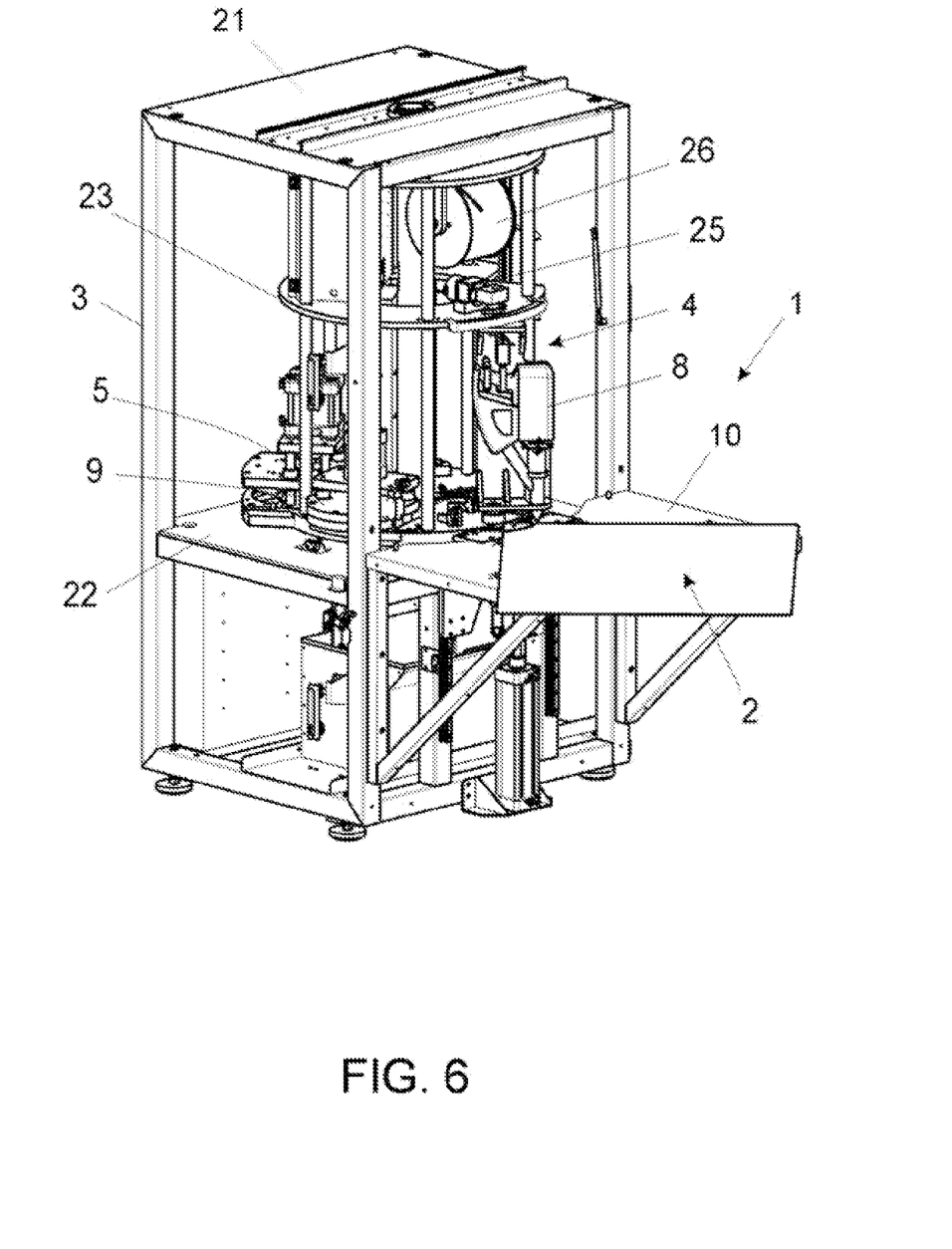
FIG. 6 shows a schematic perspective view of the machine of the invention shown in the preceding figures, in this case depicted with the welding station in the working region.
Figure 7:
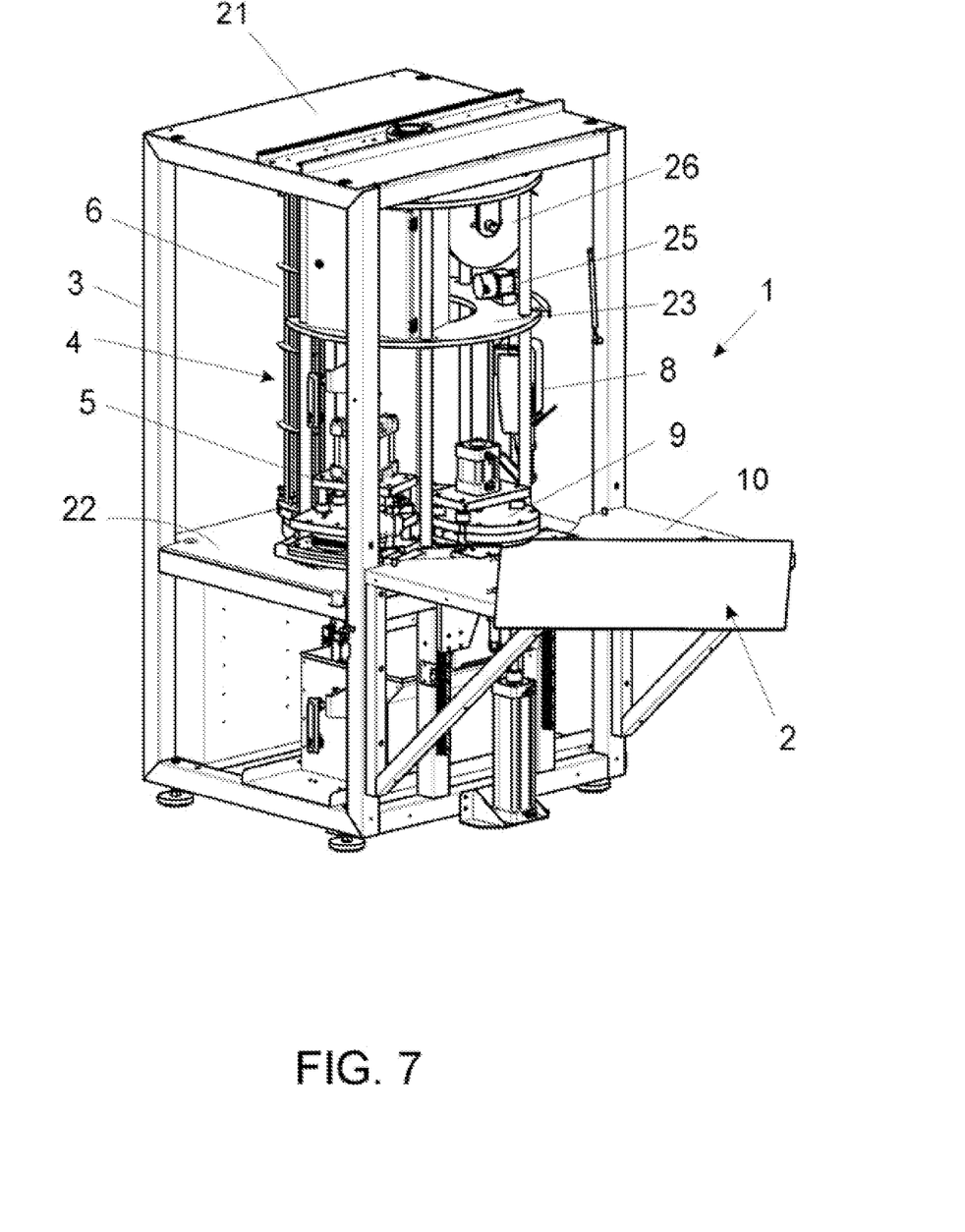
FIG. 7 shows a schematic perspective view of the machine of the invention shown in the preceding figures, in this case depicted with the pressing station in the working region.
Figure 8:
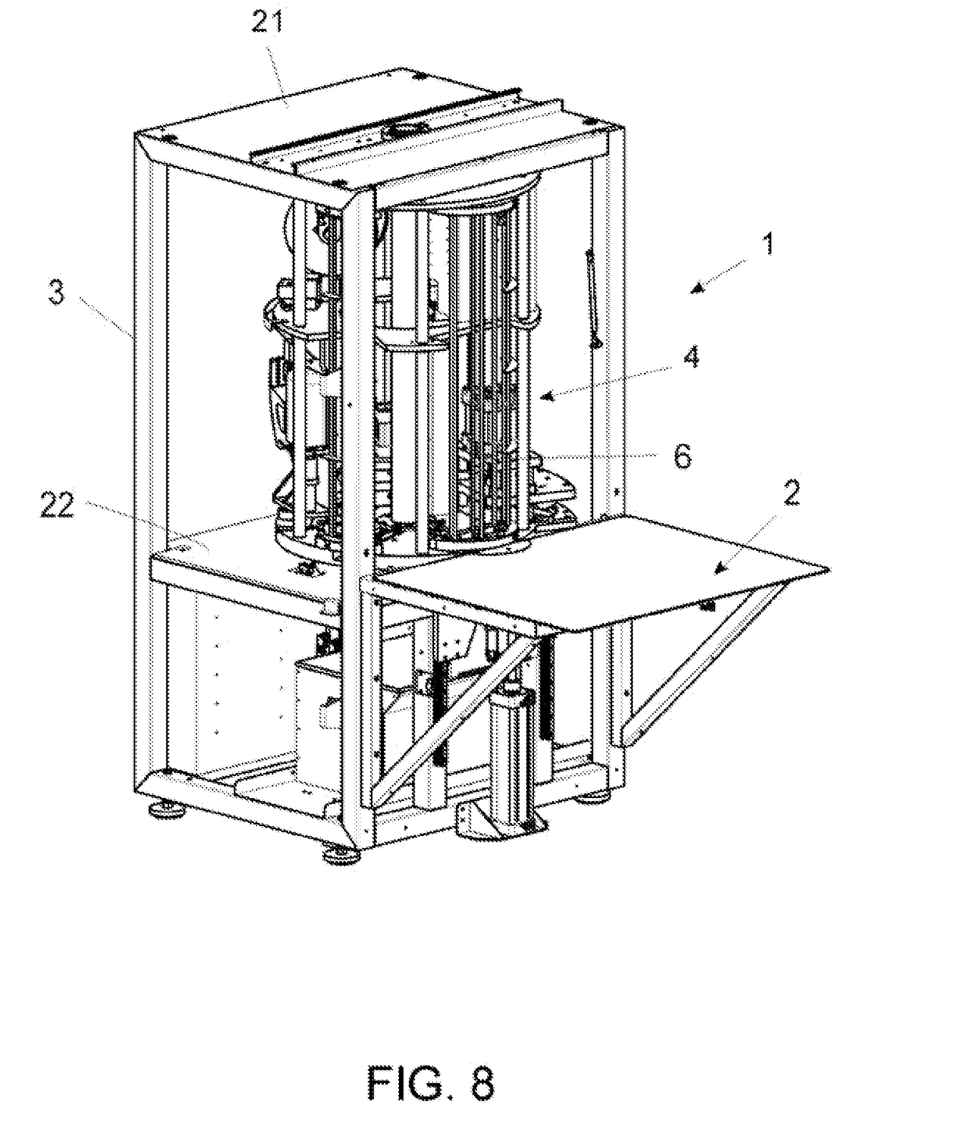
FIG. 8 shows a schematic perspective view of the machine of the invention shown in the preceding figures, in this case depicted with a sheet on the outer bench for the repair of a straight segment, and with the straight segment donor pellet store in the working region.

Moreover, in the preferred embodiment, the donor pellet holding means are an inner bench (11) which, as can be seen in FIGS. 2 and 5, moves up or down, depending on the operation to be performed, as a result of the action of the rod of a preferably pneumatic cylinder (14) on which it is incorporated. The inner bench (11) is preferably attached to a support inserted in vertical guides (24), such that the inner bench (11) can travel in a guided manner between a lower position and a higher position with respect to the height of the outer bench (10), and vice versa.

In another alternative embodiment (not depicted), the donor pellet holding means (11) are a mobile plate pivoting about the shaft of the rotary head (4) so as to be positioned in the corresponding donor pellet storage/dispensing station (6 or 7), as needed, and in the working region.

As an alternative or in addition to the holding performed by the inner bench (11) or, where appropriate, the mobile plate, according to a preferred embodiment, the donor pellet holding means comprise one or more mechanical anchorings (not depicted) in one or more work stations, preferably one mechanical anchoring in the welding station and another mechanical anchoring in the pressing station. The mechanical anchoring or anchorings of the donor pellet can be different in nature, as needed.

According to a preferred embodiment, the mechanical anchoring in the welding station comprises a platform which is movable under the action of one or more preferably pneumatic cylinders. According to a more preferred embodiment, the platform includes a hold-down region intended for contacting the donor pellet so as to hold said pellet. The platform can be arranged below the welding device such that the two do not collide with one another during operation. This mechanical anchoring preferably acts on the donor pellet as follows: Before starting the weld, the platform shifts until contacting the donor pellet so as to hold said pellet against the inner bench (11) or, where appropriate, against the mobile plate during welding.

According to a preferred embodiment, the mechanical anchoring in the pressing station comprises one or more hold-down plates actuated by respective pressure springs arranged, for example, in the corresponding hold-down plate. According to a more preferred embodiment, the hold-down plate or plates are situated in the lower part of the pressing device (9). This mechanical anchoring acts on the donor pellet as follows: Before starting the pressing, the hold-down plate or plates shift until contacting the donor pellet so as to hold the donor pellet against the inner bench (11) or, where appropriate, against the mobile plate during pressing.

The machine also preferably comprises a scrap bin (15) formed by a receptacle located in the lower part of the structure (3), under the rotary head (4), into which the defective parts of material cut from the sheet (2) to be repaired fall due to gravity.

Optionally, the machine likewise comprises a scrap receiving ramp (16), consisting of a plate located under the outer bench (10) for receiving the defective pieces (scraps) of the sheet after die-cutting and directing said scraps to the scrap bin. Said ramp (16) is preferably collapsible with the up and down movement of the inner bench (11) for receiving scraps and directing same to the scrap bin (15). Optionally, the scrap bin (15) can also be used as a collection receptacle for the aforementioned welding material residues.

Furthermore, in the preferred embodiment, the machine (1) has stops (17, 17') in the outer bench (10) for positioning the sheet (2) to be repaired. The stops (17, 17') are configured for positioning the sheet against same such that the defective part of the sheet is located on the notch of the outer bench (10) and facing the head.

The stops can have different configurations depending on the type of repair performed by the machine. For example, according to a particular embodiment in which the machine performs straight segment repair processes, the machine comprises two stops referred to as straight segment stops (17). The straight segment stops (17) are preferably located in a region close to the outer contour of one of the sides of the outer bench (10), namely of the side closest to the head (4), such that one of the straight segment stops (17) is situated on each side of the notch. The straight segment stops (17) are located such that an imaginary straight line which is preferably perpendicular to the radial direction of the notch is defined between same, where said radial direction is understood as the direction defined from the notch to the center of rotation of the head (4), such that it allows the positioning of a sheet (2) at 90° (positioning in which the side of the sheet with the defective region is situated at 90° with respect to the radial direction of the notch).

According to another particular embodiment in which the machine performs corner repair processes, the machine comprises several stops referred to as corner stops (17'). The corner stops (17') are arranged such that by joining them through imaginary lines, two lines merging with one another forming a contour in the form of a corner, preferably with an inner angle of 90°, are formed. The imaginary corner formed is located in the notch, and it is preferably oriented radially with respect to the center of rotation of the head, thereby allowing the positioning of a sheet at 45° (positioning in which a side of the sheet contiguous to the defective region is situated at 45° with respect to the radial direction).

In a preferred embodiment, the machine comprises a first type of stops (17) for positioning the sheet (2) when a straight segment is to be repaired (straight segment stops), which are preferably fixed; and a second type of stops (17') for positioning the sheet (2) when a corner is to be repaired (corner stops), which are preferably retractable as a result of a pneumatic system. Depending on the type of repair, the corner stops (17') move up or down, preferably due to pneumatic actuation. The corner stops (17') move up in the case of the machine operating in corner mode so as to enable positioning the corner of the sheet (2) on the notch of the outer bench (10). In the case of the machine operating in straight segment mode, the corner stops (17') move down and allow the sheet to be positioned against the straight segment stops (17) with the defective region of the sheet (2) on the notch of the outer bench (10).

The outer bench (10) preferably comprises in its central region an opening with a presence sensor (18) detecting the presence thereon of a sheet (2) to be repaired. The presence sensor (18) is a safety element which allows the repair cycle not to be started if the operator started the cycle without placing the sheet (2) to be repaired.

The structure (3) of the machine is preferably a frame of uprights and cross-members comprising a protective fairing (19) configured to protect the different parts of the machine. Access doors (20) have been provided in the fairing so that the operator can access the inside of the machine and load the donor pellet, the roll of plastic welding wire, etc. Said doors (20) preferably have safety switches.

The machine (1) optionally comprises a front transparent protective shield (not depicted), configured so that the operator cannot insert his or her hands or other body parts into dangerous regions of the machine.

Preferably, in the front part of the machine, between the fairing (19) or, where appropriate, the transparent protective shield, and the outer bench (10), there is a gap, preferably measuring 10 mm, through which the sheet (2) to be repaired can pass, but through which, as a safety measure, the hands or other parts of the operator do not fit.

The structure (3) of the machine preferably comprises an upper plate (21) and a lower plate (22) in which the upper end and the lower end of the rotating shaft of the head (4) are installed, respectively.

The rotary head (4) preferably comprises an upper platform (23) which divides said head into two heights. Preferably, at the upper height of the head (4) there is defined a housing in which there are preferably incorporated a roll of welding wire (26) and a reduction gear (25) for the rotation of the welding device (8) in the surrounding area of the welding station, this rotation of the welding device being independent of the rotation of the head (4). In turn, the rotation of the head (4) is performed by a head rotation system comprising a servomotor and a gear ring preferably located in the lower region of the machine, though they cannot be seen in the figures.

According to a preferred embodiment, the machine comprises a pneumatic vacuum system configured for acting on the donor pellet holding means (11) and the sheet holding means for holding the sheet (2). The pneumatic vacuum system preferably comprises a motor and a suction pump, as well as suction openings made in the outer bench (10) and in the donor pellet holding means (11). The motor and the suction pump are preferably located in the lower part of the structure of the machine, for example, behind the scrap bin (15).

As an alternative or in addition to the vacuum holding performed by the outer bench (10), according to a preferred embodiment, the sheet holding means for holding the sheet (2) comprise a mechanical anchoring (not depicted). The mechanical anchoring of the sheet can be of different types. According to a more preferred embodiment, the mechanical anchoring comprises a bar on the outer bench (10) which is movable under the action of one or more preferably pneumatic cylinders, such that the holding the sheet (2) is performed by the shifting of the bar until contacting the sheet, holding same against the outer bench (10).

Having sufficiently described the nature of the present invention, as well as the manner of putting it into practice, it is not considered necessary to expand on this explanation so that one skilled in the art will understand its scope and the advantages derived from it, hereby stating that within its essential nature, the invention may be carried out to practice in other embodiments which differ in detail from that indicated by way of example and which will likewise attain the protection that is sought provided that its fundamental principle is not altered, changed, or modified

The invention claimed is:

1. An automatic machine for repairing plastic sheets, comprising, incorporated in a support structure, at least:
    a rotary head, with several work stations with devices comprising at least:
        cutting means for cutting a defective region of the border of a sheet,
        donor pellet supply means to replace the cut portion of the sheet,
        welding means for welding the donor pellet to the sheet, and
        pressing means for pressing the weld;
    an outer bench configured for situating the sheet to be repaired on the same;
    donor pellet holding means for holding the donor pellet supplied by the corresponding means of the rotary head;
    sheet holding means for holding the sheet; and
    operation control means for the machine connected to a programmable automaton.

2. The machine according to claim 1, wherein the donor pellet supply means comprise specific supply means for supplying a straight segment donor pellet to replace a cut portion of a straight segment of the border of the sheet; and specific supply means for supplying a corner donor pellet to replace a cut portion of a corner of the sheet.

3. The machine according to claim 2, wherein the rotary head comprises: as supply means for supplying a straight segment donor pellet, a station with a straight segment pellet store/dispenser, in turn comprising a vertical housing with a pneumatic cylinder at the base and a locating member for pushing the pellets to a welding region; and, as supply means for supplying a corner donor pellet, a station with a corner donor pellet store/dispenser, in turn comprising a vertical housing with a pneumatic cylinder at the base and a locating member pushing the pellets to the welding region.

4. The machine according to claim 1, comprising a pneumatic vacuum system configured for acting on the donor pellet holding means and the sheet holding means for holding the sheet.

5. The machine according to claim 4, wherein the pneumatic vacuum system comprises a motor and a suction pump, as well as suction openings made in the outer bench and in the donor pellet holding means.

6. The machine according to claim 1, wherein the rotary head comprises, as cutting means for cutting a defective region of the border of the sheet, a station with a die-cutting device, operating under the action of a cylinder.

7. The machine according to claim 1, wherein the rotary head comprises, as donor pellet supply means, a station with a pellet store/dispenser, in turn comprising a vertical housing with a pneumatic cylinder at the base and a locating member for pushing the pellets to a welding region.

8. The machine according to claim 1, wherein the rotary head comprises, as welding means, a station with a welding device, in turn comprising an extruder gun which supplies, through a nozzle, a bead of hot material in plastic state, from a roll of welding wire provided for that purpose.

9. The machine according to claim 8, wherein the station with a welding device comprises: a scraper configured for cutting, before starting a new weld, welding material residues from a previous cycle that may be left in the nozzle of the welding device; and a resistor around the nozzle intended for keeping said nozzle hot.

10. The machine according to claim 1, wherein the rotary head comprises, as pressing means for pressing the weld, a station with a pressing device.

11. The machine according to claim 10, wherein the pressing device comprises a pneumatic cylinder configured for acting on a part, moving it up or down to exert pressure on the weld of the sheet to be repaired.

12. The machine according to claim 1, wherein the rotary head comprises, integrated in one and the same work station, a welding device and a pressing device as welding means for welding the donor pellet and pressing means for pressing the weld made.

13. The machine according to claim 1, wherein the donor pellet holding means are an inner bench which moves up or down as a result of the action of a rod of a cylinder on which it is incorporated, the inner bench being attached to a support inserted in vertical guides, such that the inner bench can travel in a guided manner between a lower position and a higher position with respect to the height of the outer bench, and vice versa.

14. The machine according to claim 1, wherein the donor pellet holding means are a mobile plate pivoting about a shaft of the rotary head.

15. The machine according to claim 1, comprising: a scrap bin formed by a receptacle located in the lower part of the support structure, under the rotary head, into which the defective region of the border of the sheet to be repaired, which is cut, fall due to gravity; and a scrap receiving ramp, consisting of a plate located under the outer bench for receiving scraps and directing the same to the scrap bin.

16. The machine according to claim 1, comprising a first stop for positioning the sheet when a straight segment is to be repaired, and a second stop for positioning the sheet when a corner is to be repaired, wherein the first stop is fixed and the second stop is retractable as a result of a pneumatic system.

17. The machine according to claim 1, wherein the outer bench comprises a notch in a region thereof closest to the rotary head, which is configured for situating the defective region of the sheet on same, and for different means of the machine to be able to travel over and act on the sheet without colliding with the outer bench.

18. The machine according to claim 1, wherein the support structure comprises an upper plate and a lower plate in which an upper end and a lower end of the rotating shaft of the rotary head are installed, respectively.

19. The machine according to claim 1, wherein the rotary head comprises an upper platform which divides said rotary head into an upper height and a lower height, above and below the upper platform, respectively, such that at the upper height there are incorporated some components of the machine, and a reduction gear for the rotation of the welding device in the surrounding area of the station thereof.

20. The machine according to claim 1, comprising a head rotation system in turn comprising a servomotor and a gear ring located in a lower region of the machine.

* * * * *